US009674475B2

(12) United States Patent
Hundemer

(10) Patent No.: US 9,674,475 B2
(45) Date of Patent: Jun. 6, 2017

(54) USING CLOSED-CAPTIONING DATA TO OUTPUT AN ALERT INDICATING A FUNCTIONAL STATE OF A BACK-UP VIDEO-BROADCAST SYSTEM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

(*) Notice: Subject to any disclaimer, the term of this patent is extended or adjusted under 35 U.S.C. 154(b) by 0 days.

(21) Appl. No.: 14/676,276

(22) Filed: Apr. 1, 2015

(65) Prior Publication Data

US 2016/0295154 A1 Oct. 6, 2016

(51) Int. Cl.
*H04N 5/445* (2011.01)
*H04N 7/088* (2006.01)
*H04N 17/00* (2006.01)

(52) U.S. Cl.
CPC ....... *H04N 5/44508* (2013.01); *H04N 7/0882* (2013.01); *H04N 17/00* (2013.01); *H04N 2017/008* (2013.01)

(58) Field of Classification Search
USPC .................................. 348/465, 468, 460, 461
See application file for complete search history.

(56) References Cited

U.S. PATENT DOCUMENTS

| | | | |
|---|---|---|---|
| 7,421,305 B2 | 9/2008 | Burges et al. | |
| 8,643,785 B2 | 2/2014 | Kurita et al. | |
| 8,782,722 B1 * | 7/2014 | Kellicker | H04N 7/0882 348/468 |
| 8,826,354 B2 * | 9/2014 | Pham | G10L 15/26 348/466 |
| 8,872,979 B2 | 10/2014 | Bagga et al. | |
| 8,913,187 B1 | 12/2014 | Miner et al. | |
| 8,938,089 B1 | 1/2015 | Postelnicu et al. | |
| 8,947,595 B1 | 2/2015 | Tucker et al. | |

(Continued)

FOREIGN PATENT DOCUMENTS

EP 2750405 A1 7/2014

OTHER PUBLICATIONS

Hundemer, Hank J., U.S. Appl. No. 14/992,699, filed Jan. 11, 2016.

(Continued)

*Primary Examiner* — Paulos M Natnael
(74) *Attorney, Agent, or Firm* — McDonnell Boehnen Hulbert & Berghoff LLP

(57) ABSTRACT

In one aspect, an example method for outputting an alert indicating a functional state of a back-up video-broadcast system involves a computing device receiving first closed-captioning data that corresponds to a first video-stream; the computing device receiving second closed-captioning data that corresponds to a second video-stream; the computing device making a determination that the received first closed-captioning data and the received second closed-captioning data lack a threshold extent of similarity; and responsive to the determination that the received first closed-captioning data and the received second closed-captioning data lack the threshold extent of similarity, the computing device outputting an alert.

14 Claims, 4 Drawing Sheets

(56) References Cited

U.S. PATENT DOCUMENTS

| | | | |
|---|---|---|---|
| 8,953,891 | B1 | 2/2015 | Hundemer et al. |
| 9,010,622 | B2 | 4/2015 | Kim |
| 2004/0258397 | A1 | 12/2004 | Kim |
| 2005/0172312 | A1 | 8/2005 | Lienhart et al. |
| 2006/0129822 | A1* | 6/2006 | Snijder .................. H04H 60/56 713/176 |
| 2007/0030966 | A1 | 2/2007 | Sra et al. |
| 2010/0100923 | A1 | 4/2010 | Toiyama |
| 2010/0201871 | A1* | 8/2010 | Zhang .................. G06K 9/3266 348/465 |
| 2011/0026763 | A1 | 2/2011 | Diggins |
| 2011/0134321 | A1 | 6/2011 | Berry et al. |
| 2011/0141364 | A1 | 6/2011 | Lee et al. |
| 2011/0149753 | A1 | 6/2011 | Bapst et al. |
| 2011/0208744 | A1* | 8/2011 | Chandiramani .. G06F 17/30784 707/741 |
| 2011/0292280 | A1* | 12/2011 | Sloo .................. G06F 17/30796 348/465 |
| 2013/0135995 | A1 | 5/2013 | Wu et al. |
| 2013/0163957 | A1 | 6/2013 | Ikizyan et al. |
| 2013/0169762 | A1* | 7/2013 | Kanemaru ......... H04N 13/0452 348/51 |
| 2014/0067828 | A1* | 3/2014 | Archibong .......... H04L 65/4084 707/748 |
| 2014/0109157 | A1 | 4/2014 | Kellicker |
| 2014/0259041 | A1* | 9/2014 | Sharifi ................. H04N 21/233 725/18 |
| 2014/0325556 | A1 | 10/2014 | Hoang et al. |
| 2015/0341410 | A1 | 11/2015 | Schrempp et al. |
| 2015/0365716 | A1* | 12/2015 | Fonseca, Jr. ....... H04N 5/44543 725/41 |
| 2016/0014473 | A1 | 1/2016 | Sun et al. |
| 2016/0065994 | A1 | 3/2016 | Kokaska et al. |
| 2016/0105689 | A1 | 4/2016 | Sorlander et al. |
| 2016/0127755 | A1 | 5/2016 | Woods et al. |

OTHER PUBLICATIONS

Non-Final Office Action mailed Nov. 19, 2015 of U.S. Appl. No. 14/676,297, filed Apr. 1, 2015.
Non-Final Office Action mailed Nov. 24, 2015 of U.S. Appl. No. 14/676,319, filed Apr. 1, 2015.
Hundemer, Hank J., U.S. Appl. No. 14/676,245, filed Apr. 1, 2015.
Hundemer, Hank J., U.S. Appl. No. 14/676,256, filed Apr. 1, 2015.
Hundemer, Hank J., U.S. Appl. No. 14/676,262, filed Apr. 1, 2015.
Hundemer, Hank J., U.S. Appl. No. 14/676,297, filed Apr. 1, 2015.
Hundemer, Hank J., U.S. Appl. No. 14/676,319, filed Apr. 1, 2015.
Hundemer, Hank J., U.S. Appl. No. 14/676,293, filed Apr. 1, 2015.
Notice of Allowance dated Sep. 30, 2015 of U.S. Appl. No. 14/676,262, filed Apr. 1, 2015.
Ex Parte Quayle Action dated Apr. 28, 2016 of U.S. Appl. No. 14/676,245, filed Apr. 1, 2015.
Non-Final Office Action dated Feb. 11, 2016 of U.S. Appl. No. 14/676,293, filed Apr. 1, 2015.
Notice of Allowance dated Apr. 8, 2016 of U.S. Appl. No. 14/676,297, filed Apr. 1, 2015.
Notice of Allowance dated Apr. 11, 2016 of U.S. Appl. No. 14/676,319, filed Apr. 1, 2015.
Hundemer, Hank J., U.S. Appl. No. 15/204,760, filed Jul. 7, 2016.
Hundemer, Hank J., U.S. Appl. No. 15/205,893, filed Jul. 8, 2016.
International Search Report mailed on Jul. 12, 2016 issued in connection with International Application No. PCT/US2016/024844, filed on Mar. 30, 2016, 3 pages.
Written Opinion of the International Searching Authority mailed on Jul. 12, 2016 issued in connection with International Application No. PCT/US2016/024844, filed on Mar. 30, 2016, 8 pages.
International Search Report mailed on Jul. 13, 2016 issued in connection with International Application No. PCT/US2016/024846, filed on Mar. 30, 2016, 3 pages.
Written Opinion of the International Searching Authority mailed on Jul. 13, 2016 issued in connection with International Application No. PCT/US2016/024846, filed on Mar. 30, 2016, 7 pages.
International Search Report mailed on Jul. 8, 2016 issued in connection with International Application No. PCT/US2016/024847, filed on Mar. 30, 2016, 3 pages.
Written Opinion of the International Searching Authority mailed on Jul. 8, 2016 issued in connection with International Application No. PCT/US2016/024847, filed on Mar. 30, 2016, 7 pages.
International Search Report mailed on Jul. 22, 2016 issued in connection with International Application No. PCT/US2016/024849, filed on Mar. 30, 2016, 3 pages.
Written Opinion of the International Searching Authority mailed on Jul. 22, 2016 issued in connection with International Application No. PCT/US2016/024849, filed on Mar. 30, 2016, 7 pages.
Final Office Action mailed Jul. 8, 2016 of U.S. Appl. No. 14/676,276, filed Apr. 1, 2015.
Final Office Action mailed Aug. 10, 2016 of U.S. Appl. No. 14/676,293, filed Apr. 1, 2015.
Notice of Allowance dated Aug. 11, 2016 of U.S. Appl. No. 14/676,245, filed Apr. 1, 2015.
Witten Opinion of the International Searching Authority mailed on Aug. 18, 2016 issued in connection with International Application No. PCT/US2016/024848, filed on Mar. 30, 2016, 7 pages.
Non-Final Office Action mailed Aug. 22, 2016 of U.S. Appl. No. 15/204,760, filed Jul. 7, 2016.
Witten Opinion of the International Searching Authority mailed on Aug. 22, 2016 issued in connection with International Application No. PCT/US2016/024850, filed on Mar. 30, 2016, 7 pages.
Mitten Opinion of the International Searching Authority mailed on Aug. 19, 2016 issued in connection with International Application No. PCT/US2016/024851, filed on Mar. 30, 2016, 7 pages.
International Search Report mailed on Aug. 18, 2016 issued in connection with International Application No. PCT/US2016/024848, filed on Mar. 30, 2016, 3 pages.
International Search Report mailed on Aug. 22, 2016 issued in connection with International Application No. PCT/US2016/024850, filed on Mar. 30, 2016, 4 pages.
International Search Report mailed on Aug. 19, 2016 issued in connection with International Application No. PCT/US2016/024851, 3 pages.
Non-Final Office Action mailed Sep. 19, 2016 of U.S. Appl. No. 15/205,893, filed Jul. 8, 2016.
Notice of Allowance dated Oct. 10, 2016 of U.S. Appl. No. 14/676,256, filed Apr. 1, 2015.
Non-Final Office Action dated Apr. 21, 2016 of U.S. Appl. No. 14/676,256, filed Apr. 1, 2015.
Notice of Allowance dated Nov. 7, 2016 of U.S. Appl. No. 14/992,699, filed Jan. 11, 2016.
Notice of Allowance dated Dec. 30, 2016 of U.S. Appl. No. 15/204,760, filed Jul. 7, 2016.
Notice of Allowance dated Nov. 17, 2016 of U.S. Appl. No. 14/676,293, filed Apr. 1, 2015.
Hundemer, Hank J., U.S. Appl. No. 15/349,911, filed Nov. 11, 2016.
Hundemer, Hank J., U.S. Appl. No. 15/398,258, filed Jan. 4, 2017.
Notice of Allowance dated Jan. 23, 2017 of U.S. Appl. No. 15/205,893, filed Jul. 8, 2016.
Non-Final Office Action dated Feb. 8, 2017 of U.S. Appl. No. 15/398,258, filed Jan. 4, 2017.

* cited by examiner

USING CLOSED-CAPTIONING DATA TO OUTPUT AN ALERT INDICATING A FUNCTIONAL STATE OF A BACK-UP VIDEO-BROADCAST SYSTEM

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

A video-broadcast system may be configured to generate and broadcast a video stream to a set of receivers (e.g., set-top boxes) for viewing by end-users. In some instances, two different video-broadcast systems (a primary and a back-up) may be configured to generate the same (or substantially the same) video streams at the same (or substantially the same) time. As such, the primary and back-up systems may generate primary and back-up streams, respectively. With this arrangement, the primary system may broadcast the primary stream to the set of receivers unless and until the primary system becomes inoperative, in which case the back-up system may take over and broadcast the back-up stream to the set of receivers instead.

SUMMARY

In a first aspect, an example method for outputting an alert indicating a functional state of a back-up video-broadcast system involves: a computing device receiving first closed-captioning data that corresponds to a first video-stream; the computing device receiving second closed-captioning data that corresponds to a second video-stream; the computing device making a determination that the received first closed-captioning data and the received second closed-captioning data lack a threshold extent of similarity; and responsive to the determination that the received first closed-captioning data and the received second closed-captioning data lack the threshold extent of similarity, the computing device outputting an alert.

In a second aspect, a non-transitory computer-readable medium has stored thereon program instructions that when executed cause a computing device to perform of a set of acts for outputting an alert indicating a functional state of a back-up video-broadcast system, the set of acts involving: receiving first closed-captioning data that corresponds to a first video-stream; receiving second closed-captioning data that corresponds to a second video-stream; making a determination that the received first closed-captioning data and the received second closed-captioning data lack a threshold extent of similarity; and responsive to the determination that the received first closed-captioning data and the received second closed-captioning data lack the threshold extent of similarity, outputting an alert.

In a third aspect, a computing device includes a processor and a non-transitory computer-readable medium having stored thereon program instructions that when executed by the processor cause the computing device to perform of a set of acts for outputting an alert indicating a functional state of a back-up video-broadcast system, the set of acts involving: receiving first closed-captioning data that corresponds to a first video-stream; receiving second closed-captioning data that corresponds to a second video-stream; making a determination that the received first closed-captioning data and the received second closed-captioning data lack a threshold extent of similarity; and responsive to the determination that the received first closed-captioning data and the received second closed-captioning data lack the threshold extent of similarity, outputting an alert.

DETAILED DESCRIPTION

I. Overview

Figure 1:
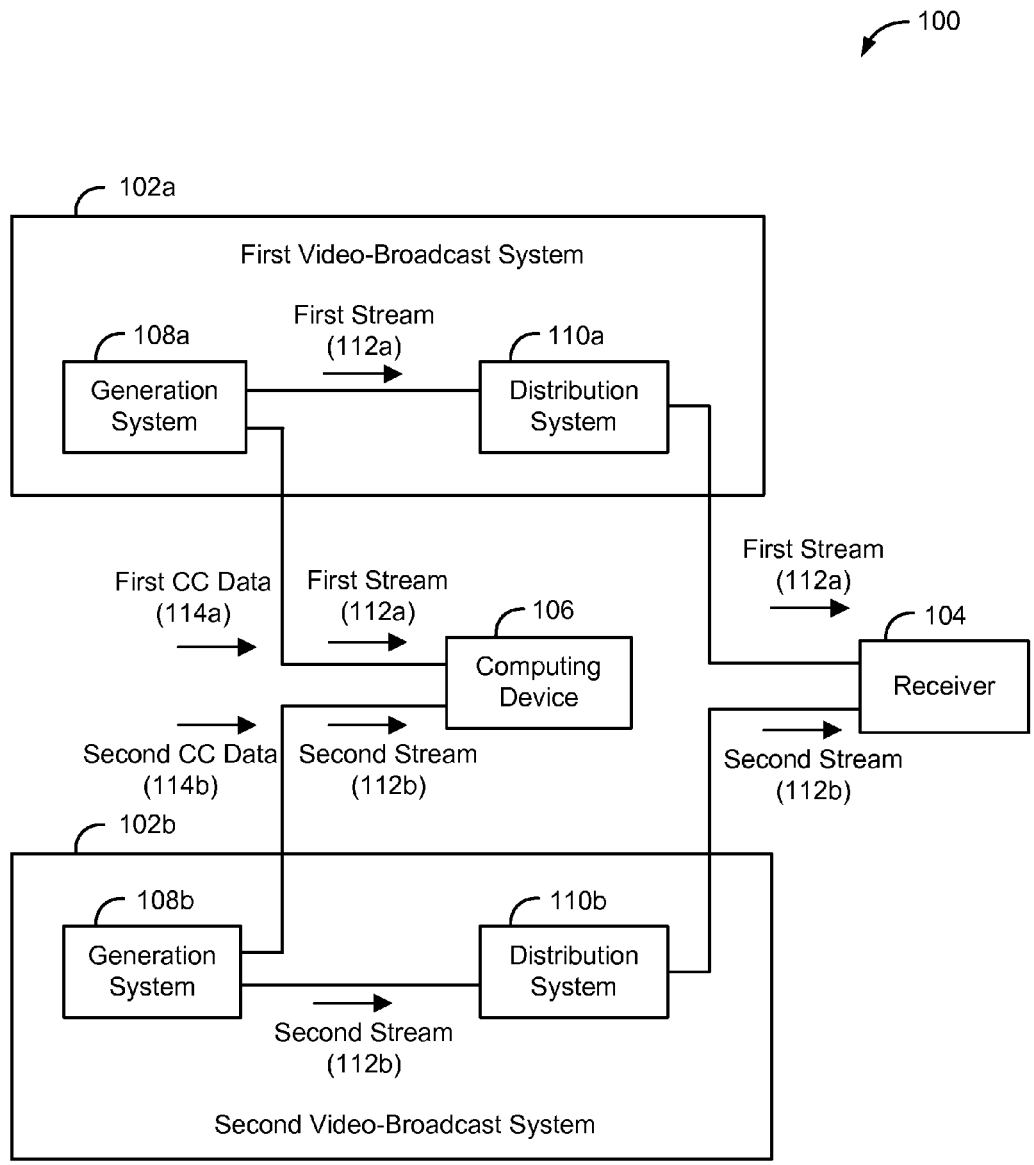
FIG. 1 is a simplified block diagram illustrating an example system according to the present disclosure.

As indicated above, in some instances, primary and back-up systems may generate primary and back-up video streams, respectively, and in the event that the primary system becomes inoperable, the back-up system may broadcast the back-up stream to take the place of the primary stream. Given this, at any given time, it may be desirable to determine a functional state of the back-up system. In particular, it may be desirable to determine whether the back-up system is in fact generating a back-up stream, thus allowing the back-up system to take over if necessary. In the event that the back-up system is not generating a back-up stream, it may be desired to output an alert so that the issue with the back-up system can be addressed.

One approach for determining a functional state of the back-up system involves a computing device conducting a bit-by-bit comparison of a primary stream and a corresponding purported back-up stream to determine whether the streams are exact copies of each other. After making this comparison, if the device determines that there is a discrepancy between the two streams, the device may output an alert (i.e., to indicate that the back-up system is not functioning properly).

However, in some cases, this approach may not provide useful results. This may be the case where the two streams are not identical, but where they represent respective portions of video content that are perceptually indistinguishable from each other (from the perspective of a typical end-user). Such streams may not be identical for a variety of reasons, such as due to a digital signal processing artifact that is present in one stream, but not in the other. Given this scenario, despite the fact that the back-up system is generating a back-up stream that should be considered to be an acceptable back-up of the primary stream, due to the nature of the bit-by-bit comparison, the device may nonetheless output an alert.

The present disclosure provides an alternative and improved approach for determining a functional state of a back-up system, and for outputting an alert indicating the functional state, and is based, at least in part, on a consideration of closed-captioning data.

Closed-captioning is a video-related service that was developed for the hearing-impaired. When closed-captioning is enabled, video content and closed-captioning text (typically representing corresponding audio content) are displayed as the video content is played. The closed-captioning text may represent, for example, spoken dialog or sound effects corresponding to the video content, thereby helping a viewer to comprehend what is being presented in the video content. Closed-captioning may also be disabled such that the video content may be displayed without the closed-captioning text.

Closed-captioning text may be generated in a variety of manners. For example, a computer-based automatic speech-recognition system may convert spoken dialog into text. Another technique may involve an individual listening to audio content and manually typing out corresponding text.

After the closed-captioning text is generated, it may be encoded and stored in the form of closed-captioning data. Closed-captioning data may then be embedded in or otherwise associated with the corresponding video content. In some cases, a video-broadcast system may add the closed-captioning data to a video stream, for example in line 21 of an analog format broadcast according to the National Televisions Systems Committee (NTSC) standard, and may then broadcast the video stream to a set of receivers for viewing by end-users.

In one aspect, disclosed is a method that involves a computing device receiving first closed-captioning data that corresponds to a first video-stream, and to first video-content represented by the first video-stream. The method further involves the device receiving second closed-captioning data that corresponds to a second video-stream, and to second video-content represented by the second video-stream. One of the first and second video streams is a primary stream, and the other is a corresponding purported back-up stream.

The method further involves the device making a determination that the received first closed-captioning data and the received second closed-captioning data lack a threshold extent of similarity, and, responsive to the determination, the device outputting an alert. As compared to the bit-by-bit comparison approach described above, by comparing closed-captioning data, the device may more accurately determine whether or not a purported back-up stream is in fact a back-up stream. Indeed, in the case where the first and second streams are not identical, but where they represent respective portions of video content that are perceptually indistinguishable from each other, the portions are likely to have the same (or similar) closed-captioning data, and therefore, in accordance with the disclosed technique, the device may appropriately forgo outputting an alert. On the other hand, in the case where the respective portions of video content are perceptually distinguishable from each other, in accordance with the disclosed technique, the device may appropriately output an alert (i.e., to indicate that the back-up system is not functioning properly).

II. Example System

FIG. 1 is a simplified block diagram illustrating an example system 100. The system 100 may include at least two video-broadcast systems, including a first system 102a and a second system 102b. One of the first and second systems 102a, 102b may serve as a primary system, and other may serve as a back-up system. The system 100 may further include a receiver 104, and a computing device 106.

The first system 102a may include a generation system 108a and a distribution system 110a. The generation system 108a may be configured for generating a first video-stream 112a, and may include various components, including for example a video source, a router, a switcher, and/or a broadcast automation system. The generation system 108a may further be configured for generating first closed-captioning data 114a corresponding to the first stream 112a. In one example, the first closed-captioning data 114a is embedded in the first stream 112a.

The generation system 108a may be connected to the distribution system 110a, which in turn may be connected to the receiver 104. The distribution system 110a may be configured for distributing the first stream 112a to the receiver 104. The distribution system 110a may include various components such as a terrestrial antenna or a satellite, and may be configured for distributing the first stream 112a to the receiver 104 in a variety of ways (e.g., over the air transmission). The receiver 104 may take a variety of forms, including for example, a television or a television set-top box.

The second system 102b may be configured in a same or similar manner to that of the first system 102a. As such, the second system 102b may include a generation system 108b and a distribution system 110b. The generation system 108b may be configured for generating a second video-stream 112b, and may include various components, including for example a media source, a router, a switcher, and/or a broadcast automation system. The generation system 108a may further be configured for generating second closed-captioning data 114b corresponding to the second stream 112b. In one example, the second closed-captioning data 114b is embedded in the second stream 112b. The generation system 108b may be connected to the distribution system 110b, which in turn may be connected to the receiver 104. The distribution system 110b may be configured for distributing the second stream 112b to the receiver 104. The distribution system 110b may include various components such as a terrestrial antenna or a satellite, and may be configured for distributing the second stream 112b to the receiver 104 in a variety of ways.

While the generation system 108 may generate the first stream 112a and the generation system 108b may generate the second stream 112b at or about the same time, the system 100 may be configured such that only one of the distribution systems 110a, 110b distributes its respective generated stream to the receiver 104 at a given time. In practice, provided the first system 102a is operational, the distribution system 110a may distribute the first stream 112a to the receiver 104, unless and until the first system 102b becomes inoperative, in which case the second system 102b may take over and the distribution system 110b may distribute the second stream 112b to the receiver 104 instead. In this scenario, the first system 102a may be considered the primary system and the second system 102b may be considered the back-up system. Likewise, the first stream 112a may be considered the primary stream, and the second stream 112b may be considered the back-up stream.

Given the possibility of the second system 102b taking over for the first system 102a, at any given time, it may be desirable to determine a functional state of the second system 102b. In particular, it may be desirable to determine whether the second system 102b is in fact generating a back-up stream, thus allowing the second system 102b to take over if necessary. In the event that the second up system 102b is not generating a back-up stream, it may be desired to generate alert so that the issue with the second system 102b can be addressed (e.g., by an operator or automatically by another system).

The device 106 may be configured to generate such an alert. The device 106 may be connected to both generation systems 108b, 108b. With this arrangement, the device 106 may receive the first closed-captioning data 114a and the second closed-captioning data 114b (by receiving the first stream 112a and the second stream 112b, respectively). Notably, in some instances, at least one of the first closed-captioning data 114a and the second closed-captioning data 114b may not be embedded in a respective video stream, and thus the device 106 may separately receive at least one of the first closed-captioning data 114a and/or the second closed-captioning data 114b. Further, the device 106 may make a determination that the received first closed-captioning data 114a and the received second closed-captioning data 114b lack a threshold extent of similarity, and in response to the determination, the device 106 may output an alert.

In some examples, a video-broadcast system may be integrated with an audio-broadcast system, such that a video stream representing video content may be broadcast together with an audio stream representing corresponding audio content. In some instances, the video stream and the audio stream may be combined into a single media stream.

Figure 2:
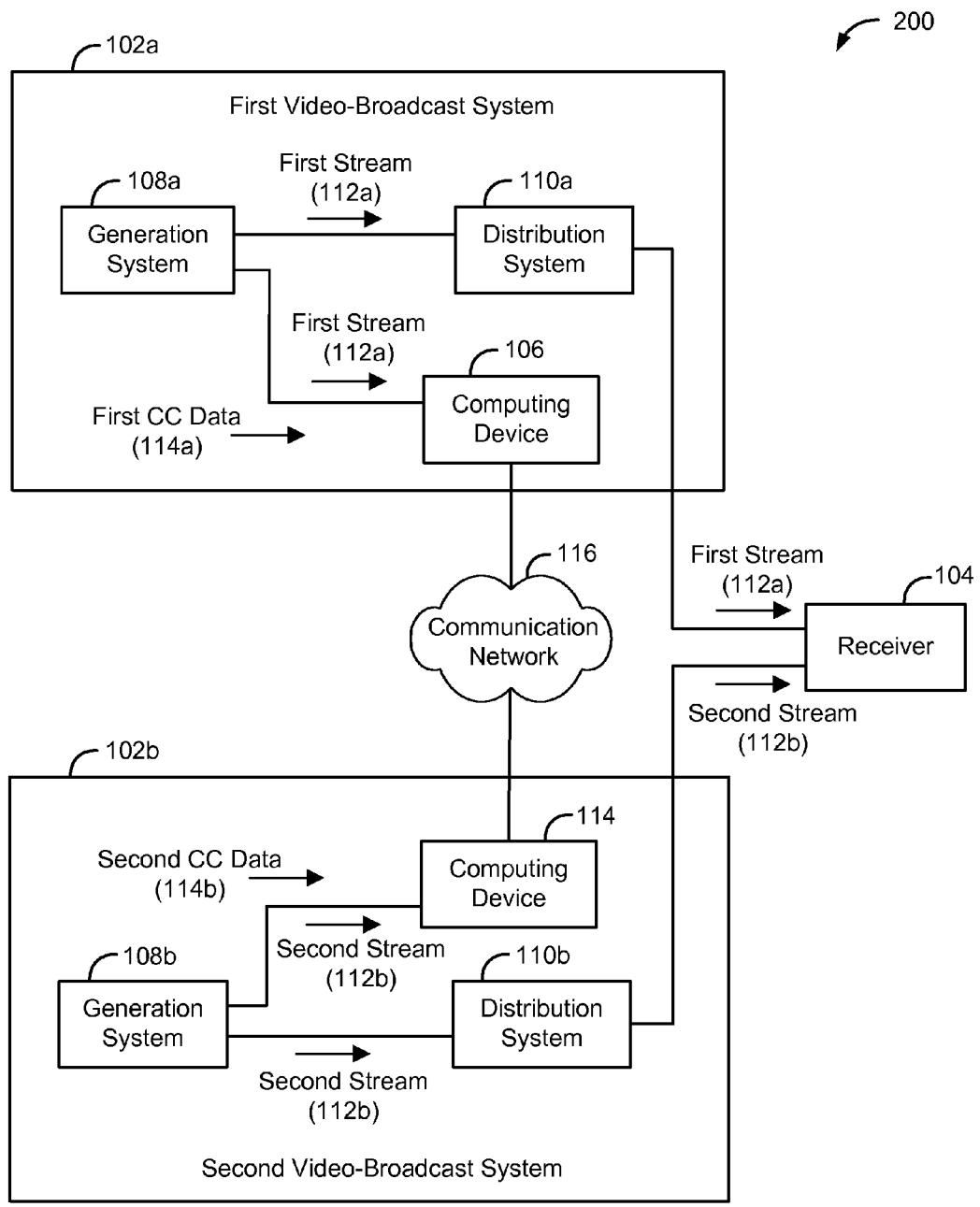
FIG. 2 is a simplified block diagram illustrating another example system according to the present disclosure.

FIG. 2 is a simplified block diagram illustrating an example system 200. The system 200 may be the same as or similar to the system 100, except that the system 200 includes another computing device 114, and a communication network 116 connecting the device 106 and the device 114, and through which the device 106 and the device 114 may communicate. The device 114 is also connected to the generation system 108b. The communication network 116 may take a variety of forms. For example, the communication network 116 may be a packet-switched network such as the Internet.

With this arrangement, the device 106 may receive the first stream 112a, and the first closed-captioning data 114a. Further, the device 114 may receive the second stream 112b and the second closed-captioning data 114b. The device 114 may transmit the second closed-captioning data 114a to the device 106, and the device 106 may receive the same. The device 106 may then make a determination that the received first closed-captioning data 114a and the received second closed-captioning 114b data lack a threshold extent of similarity, and in response to the determination, the device 106 may output an alert.

Figure 3:
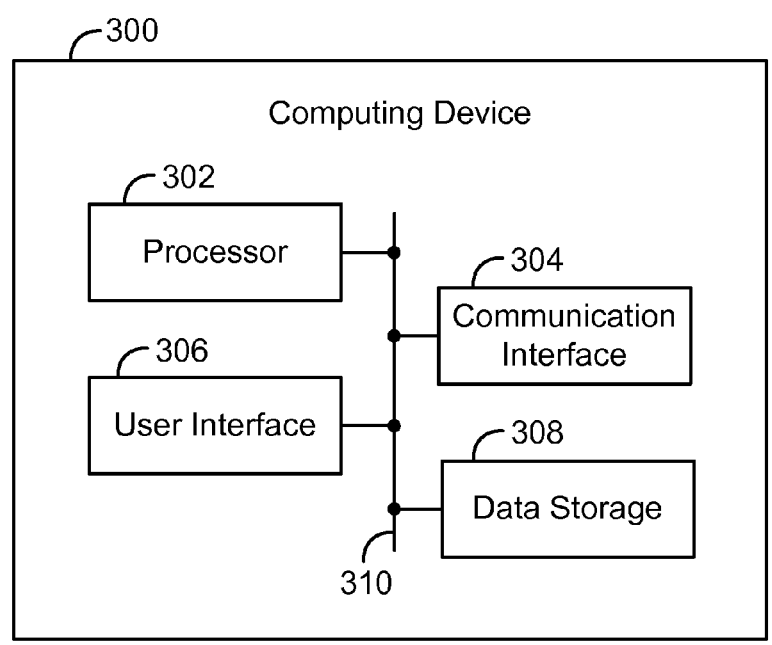
FIG. 3 is a simplified block diagram illustrating an example computing device according to the present disclosure.

FIG. 3 is a simplified block diagram illustrating an example computing device 300. The device 300 may represent the device 106 or the device 114, for instance. The device 300 may be configured for performing a variety of functions or acts, such as those described in this disclosure (including the accompanying drawings). The device 300 may include various components, including for example, a processor 302, a communication interface 304, a user interface 306, and a data storage 308. The components of the device 300 may be communicatively connected to each other (or other devices or systems) via a system bus, network, or other connection mechanism 310.

The processor 302 may include a general purpose processor (e.g., a microprocessor) and/or a special purpose processor (e.g., a digital signal processor (DSP)).

The communication interface 304 may be configured to allow the device 300 to communicate with one or more devices (or systems) according to one or more protocols. In one example, the communication interface 304 may be a wired interface, such as an Ethernet interface or a high-definition serial-digital-interface (HD-SDI). As another example, the communication interface 304 may be a wireless interface, such as a cellular or WI-FI interface.

The user interface 306 may facilitate interaction with a user of the device, if applicable. As such, the user interface 306 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system.

The data storage 308 may include one or more volatile, non-volatile, removable, and/or non-removable storage components, such as magnetic, optical, or flash storage, and may be integrated in whole or in part with the processor 302. Further, the data storage 308 may take the form of a non-transitory computer-readable storage medium, having stored thereon program instructions (e.g., compiled or non-compiled program logic and/or machine code) that, when executed by the processor 302, cause the device 300 to perform one or more functions or acts, such as those described in this disclosure. Such program instructions may define or be part of a discrete software application that can be executed in response to certain inputs received from the user interface 306, for instance. The data storage 308 may also store other types of information or data, such as those types described throughout this disclosure.

III. Example Operations

Figure 4:
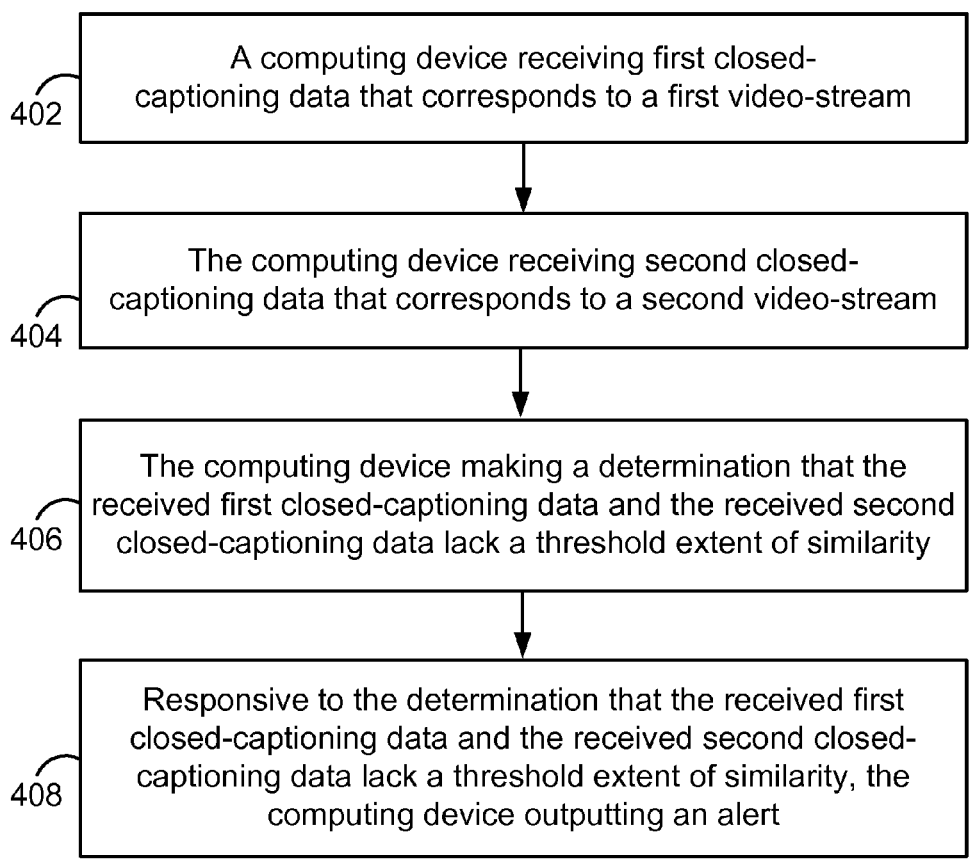
FIG. 4 is a flow chart illustrating an example method according to the present disclosure.

FIG. 4 is a flow chart illustrating an example method 400. At block 402, the method may involve a computing device receiving first closed-captioning data that corresponds to a first video-stream. For instance, this may involve the device 106 receiving the first data 114a from the generation system 108a.

At block 404, the method may involve the computing device receiving second closed-captioning data that corresponds to a second video-stream. For instance, this may involve the device 106 receiving the second closed-captioning data 114b from the generation system 108b. As another example, this may involve the device 106 receiving the second closed-captioning data 114b from the device 114.

At block 406, the method may involve the computing device making a determination that the received first closed-captioning data and the received second closed-captioning data lack a threshold extent of similarity. For instance, this may involve the device 106 making a determination that the first closed-captioning data 114a and the second closed-captioning data 114b lack a threshold extent of similarity.

The threshold extent of similarity may be based on a variety of factors, such as the text represented by closed-captioning data, and/or the time associated with any such text. For instance, the device 106 may make the determination that the received first closed-captioning data and the received second closed-captioning data lack a threshold extent of similarity by determining that the first closed-captioning data represents first text that is not represented by the second closed-captioning data.

In one example, closed-captioning text may be associated with a time, such as a time when the text is provided to a set of receivers for display. The device 106 may utilize a time synchronization service (e.g., a global positioning system (GPS) time synchronization service), to determine such a time. The time may be represented in a variety of formats, such as by specifying a number of hours, minutes, seconds, and frames (which is commonly represented in HH:MM:SS:FF format).

In this case, the device 106 may make the determination that the received first closed-captioning data and the received second closed-captioning data lack a threshold extent of similarity by determining that the second closed-captioning data does not represent the first text associated with a second time that is within a tolerance period (e.g., one minute) of the first time.

Additionally or alternatively, the device 106 may make the determination that the received first closed-captioning data and the received second closed-captioning data lack a threshold extent of similarity by determining that a first data-size of the first closed-captioning data and a second data-size of the second closed-captioning data lack a threshold extend of similarity. This may involve determining that the file data-sizes are not identical or that they differ by at least a threshold amount.

At block 408, the method may involve responsive to the determination that the received first closed-captioning data and the received second closed-captioning data lack the threshold extent of similarity, outputting an alert. For instance, this may involve responsive to the determination that the first closed-captioning data 114a and the second closed-captioning data 114b lack a threshold extent of similarity, the device 106 outputting an alert.

The act of outputting an alert may take a variety of forms. For instance, this may involve the device 106 displaying a message. Alternatively or additionally, this may involve the device 106 transmitting an instruction to another system or device. Such an instruction may cause the system or device to initiate a diagnostic and/or repair process in connection with the second system 102b.

IV. Example Variations

While one or more acts have been described as being performed by certain devices, systems, or entities (e.g., the computing device 106), the acts may be performed by any device, system, or entity, such as those described in connection with the first system 100 or the second system 200. Furthermore, the devices and systems need not be discrete entities. Some or all of the devices or systems may be combined in a single device.

In addition, the acts described herein need not be performed in the disclosed order, although in some examples and order may be preferred. Also, not all acts need to be performed to achieve the desired advantages of the disclosed systems, devices, and methods, and therefore not all acts are required. Variations discussed in connection with one example may be applied to all other examples disclosed herein.

While select examples of the present disclosure have been described, alterations and permutations of these examples will be apparent to those of ordinary skill in the art. Other changes, substitutions, and alterations are also possible without departing from the invention on its broader aspects as set forth in the following claims.

The invention claimed is:

1. A method for outputting an alert indicating a functional state of a back-up video-broadcast system, the method comprising:
    a computing device receiving first closed-captioning data that (i) corresponds to a first video-stream generated by a primary media-broadcast system, and (ii) represents first text associated with a first time;
    the computing device receiving second closed-captioning data that corresponds to a second video-stream generated by the back-up media-broadcast system;
    the computing device making a determination that the received first closed-captioning data and the received second closed-captioning data lack a threshold extent of similarity, wherein making the determination that the received first closed-captioning data and the received second closed-captioning data lack a threshold extent of similarity comprises determining that the second closed-captioning data does not represent the first text associated with a second time that is within a tolerance period of the first time; and
    responsive to the determination that the received first closed-captioning data and the received second closed-captioning data lack the threshold extent of similarity, the computing device outputting an alert.

2. The method of claim 1, wherein making the determination that the received first closed-captioning data and the received second closed-captioning data lack a threshold extent of similarity further comprises determining that the first text is not represented by the second closed-captioning data.

3. The method of claim 1, wherein making the determination that the received first closed-captioning data and the received second closed-captioning data lack a threshold extent of similarity further comprises determining that a first data-size of the first closed-captioning data and a second data-size of the second closed-captioning data lack a threshold extend of similarity.

4. The method of claim 1, wherein outputting an alert comprises displaying a message.

5. The method of claim 1, wherein outputting an alert comprises transmitting an instruction.

6. A non-transitory computer-readable medium having stored thereon program instructions that when executed cause a computing device to perform a set of acts for outputting an alert indicating a functional state of a back-up video-broadcast system, the set of acts comprising:
    receiving first closed-captioning data that (i) corresponds to a first video-stream generated by a primary media-broadcast system, (ii) represents first text associated with a first time;
    receiving second closed-captioning data that corresponds to a second video-stream generated by the back-up media-broadcast system;
    making a determination that the received first closed-captioning data and the received second closed-captioning data lack a threshold extent of similarity, wherein making the determination that the received first closed-captioning data and the received second closed-captioning data lack a threshold extent of similarity comprises determining that the second closed-captioning data does not represent the first text associated with a second time that is within a tolerance period of the first time; and
    responsive to the determination that the received first closed-captioning data and the received second closed-captioning data lack the threshold extent of similarity, outputting an alert.

7. The non-transitory computer-readable medium of claim 6, wherein making the determination that the received first closed-captioning data and the received second closed-captioning data lack a threshold extent of similarity further comprises determining that the first text is not represented by the second closed-captioning data.

8. The non-transitory computer-readable medium of claim 6, wherein making the determination that the received first closed-captioning data and the received second closed-captioning data lack a threshold extent of similarity further comprises determining that a first data-size of the first closed-captioning data and a second data-size of the second closed-captioning data lack a threshold extend of similarity.

9. The non-transitory computer-readable medium of claim 6, wherein outputting an alert comprises displaying a message.

10. The non-transitory computer-readable medium of claim 6, wherein outputting an alert comprises transmitting an instruction.

11. A computing device comprising:
a processor; and
a non-transitory computer-readable medium having stored thereon program instructions that when executed by the processor cause the computing device to perform a set of acts for outputting an alert indicating a functional state of a back-up video-broadcast system, the set of acts comprising:
receiving first closed-captioning data that (i) corresponds to a first video-stream generated by a primary media-broadcast system, and (ii) represents first text associated with a first time;
receiving second closed-captioning data that corresponds to a second video-stream generated by the back-up media-broadcast system;
making a determination that the received first closed-captioning data and the received second closed-captioning data lack a threshold extent of similarity, wherein making the determination that the received first closed-captioning data and the received second closed-captioning data lack a threshold extent of similarity comprises determining that the second closed-captioning data does not represent the first text associated with a second time that is within a tolerance period of the first time; and
responsive to the determination that the received first closed-captioning data and the received second closed-captioning data lack the threshold extent of similarity, outputting an alert.

12. The computing device of claim 11, wherein making the determination that the received first closed-captioning data and the received second closed-captioning data lack a threshold extent of similarity further comprises determining that the first text is not represented by the second closed-captioning data.

13. The computing device of claim 11, wherein outputting an alert comprises displaying a message.

14. The computing device of claim 11, wherein outputting an alert comprises transmitting an instruction.

* * * * *